US011656028B2

(12) United States Patent
Ferguson et al.

(10) Patent No.: US 11,656,028 B2
(45) Date of Patent: May 23, 2023

(54) DRAIN PUMP FOR A SPRAY-COOLED METALLURGICAL FURNACE

(71) Applicant: Systems Spray-Cooled, Inc., Smyrna, TN (US)

(72) Inventors: Scott A. Ferguson, Murfreesboro, TN (US); Troy D. Ward, Franklin, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 749 days.

(21) Appl. No.: 16/600,160

(22) Filed: Oct. 11, 2019

(65) Prior Publication Data

US 2020/0132373 A1 Apr. 30, 2020

Related U.S. Application Data

(60) Provisional application No. 62/752,057, filed on Oct. 29, 2018.

(51) Int. Cl.
*F27D 1/12* (2006.01)
*F27D 1/02* (2006.01)
(Continued)

(52) U.S. Cl.
CPC .............. *F27D 1/12* (2013.01); *F27D 1/02* (2013.01); *F27D 11/08* (2013.01); *F27D 2009/0016* (2013.01); *F27D 2009/0067* (2013.01)

(58) Field of Classification Search
CPC ... F27D 1/12; F27D 1/02; F27D 11/08; F27D 2009/0016; F27D 2009/0067
See application file for complete search history.

(56) References Cited

U.S. PATENT DOCUMENTS 4,715,042 A 12/1987 Heggart et al.
4,789,991 A 12/1988 Metelmann et al.
(Continued)

FOREIGN PATENT DOCUMENTS

EP 0015049 A1 9/1980
KR 100894302 B1 4/2009
(Continued)

OTHER PUBLICATIONS

PCT Notification of Transmittal of the International Search Report and the Written Opinion of the International Searching Authority for International Application No. PCT/US2019/055936; dated Mar. 17, 2020; 13 total pages.
(Continued)

*Primary Examiner* — Scott R Kastler
(74) *Attorney, Agent, or Firm* — Patterson + Sheridan, LLP (57) ABSTRACT

An apparatus is disclosed for a spray-cooled roof of a tilting metallurgical furnace having a drain pump. The spray-cooled roof has a hollow metal roof section. The hollow metal roof section has an outer metal covering member, an inner metal base member spaced from and opposite the outer metal covering member, an enclosed space disposed between the outer metal covering member and the inner metal base member, and a spray-cooled system disposed in the enclosed space. An evacuation drain is fluidly coupled to the enclosed space and a pump is integrated into the spray-cooled roof and coupled to the evacuation drain.

19 Claims, 9 Drawing Sheets

(51) Int. Cl.
F27D 11/08 (2006.01)
F27D 9/00 (2006.01)

(56) References Cited

U.S. PATENT DOCUMENTS

| | | | |
|---|---|---|---|
| 4,813,055 A * | 3/1989 | Heggart | ................... F27B 3/24 |
| | | | 373/74 |
| 4,849,987 A | 7/1989 | Miner, Jr. et al. | |
| 5,115,184 A | 5/1992 | Arthur et al. | |
| 5,444,734 A | 8/1995 | Arthur et al. | |
| 5,887,017 A | 3/1999 | Arthur et al. | |
| 2018/0299201 A1 | 10/2018 | Ferguson et al. | |
| 2020/0132373 A1* | 4/2020 | Ferguson | ................... F27D 1/12 |

FOREIGN PATENT DOCUMENTS

| | | |
|---|---|---|
| WO | 8602436 A1 | 4/1986 |
| WO | 2019045801 A1 | 3/2019 |

OTHER PUBLICATIONS

Extended European Search Report dated Sep. 27, 2022 for EP 19877983.7.

* cited by examiner

DRAIN PUMP FOR A SPRAY-COOLED METALLURGICAL FURNACE

CROSS-REFERENCE TO RELATED APPLICATIONS

This application claims benefit of U.S. provisional patent application Ser. No. 62/752,057, filed Oct. 29, 2018, which is herein incorporated by reference.

BACKGROUND OF THE DISCLOSURE

Field of the Disclosure

Embodiments of the present disclosure relates generally to a spray-cooled roof for a metallurgical furnace, particularly an electric arc furnace that heats charged metal by means of an electric arc via a graphite electrode.

Description of the Related Art

Metallurgical furnaces (e.g., an electric arc furnace or a ladle metallurgical furnace) are used in the processing of molten metal materials. The electric arc furnace heats charged metal in the furnace by means of an electric arc from a graphite electrode. The electric current from the electrode passes through the charged metal material forming a molten bath of the metal materials. The furnaces house the molten materials during the processing of the molten materials forming molten steel and slag (a stony waste material).

A metallurgical furnace has a number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of furnace components, for example, the roof and sidewall of the furnace. One cooling method, referred to as non-pressurized spray-cooling, sprays a fluid-based coolant (e.g., water) against an external surface of plate. The plate may be a part of a roof of the furnace or a part of a sidewall of the furnace. For this cooling method, the fluid-based coolant is sprayed from a fluid distribution outlet at atmospheric pressure. As the fluid-based coolant contacts the external surface of the plate, the plate is relieved of heat transferred to the plate from the molten materials within the furnace, thus regulating the temperature of the plate. An evacuation system is used to continually remove spent coolant (i.e., coolant that has contacted the external surface of the plate) from the plate.

The evacuation system has pumps which removes the spent coolant from the furnace. Due to the extreme heat of the furnace and the coolant, the pumps are typically located remotely from the furnace and the evacuation system is plumbed from the furnace to the pumps. However, the pumps can be quite large and take up valuable floor space at the furnace facility. The drain system is pressurized between the furnaces and the pumps drawing coolant away from the furnace. With pressurized drain systems comes the potential for plumbing leaks which can be dangerous if the spent coolant contacts an extremely hot surface of the furnace. Additionally, the distance requires a large amount of energy to pump the spent coolant from the furnace to the remotely located pump.

Therefore, there is a need for an improved evacuation system for the spray-cooled furnace.

SUMMARY

An apparatus is disclosed for a spray-cooled roof of a tilting metallurgical furnace having a drain pump. The spray-cooled roof has a hollow metal roof section. The hollow metal roof section has an outer metal covering member, an inner metal base member spaced from and opposite the outer metal covering member, an enclosed space disposed between the outer metal covering member and the inner metal base member, and a spray-cooled system disposed in the enclosed space. An evacuation drain is fluidly coupled to the enclosed space and a pump is integrated into the spray-cooled roof and coupled to the evacuation drain.

In another embodiment, a method for removing spent coolant from within a spray-cooled roof of a metallurgical furnace is disclosed. The method begins by directing spent coolant from inside the spray-cooled roof to a peripheral drain. The spent coolant is then pumped from the peripheral drain with a pump integrated into the spray-cooled roof and sending the spent coolant to a collection system external to the metallurgical furnace.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present invention is directed to a metallurgical electric arc furnace having a spray-cooled roof comprising a hollow metal roof section having an integral drain pump therein or thereon. The term integral herein meaning the body of the drain pump is physically attached to the roof by techniques extending beyond mere plumbing and moves with the roof, for example, the drain pump tilts with the roof as the furnace is tilted. The spray-cooled roof is subject to temperatures suitable for melting metal materials. A spray-cooling system is employed within the hollow metal roof sections to prevent overheating and thermal stress of the spray-cooled roof's inner metal base member. A coolant supply header is a source of coolant by way of an outboard coolant supply for the spray-cooled system. Gravity fed fluid passage from an enclosed space of the hollow metal roof section drains spent cooling fluid, i.e., hot coolant, to a periphery drain of the spray-cooled roof. The drain pump is fluidly coupled to the periphery drain at the roof and discharges the spent cooling fluid from the roof of the metallurgical furnace to a location where the spent coolant can be recycled or disposed.

Figure 1:
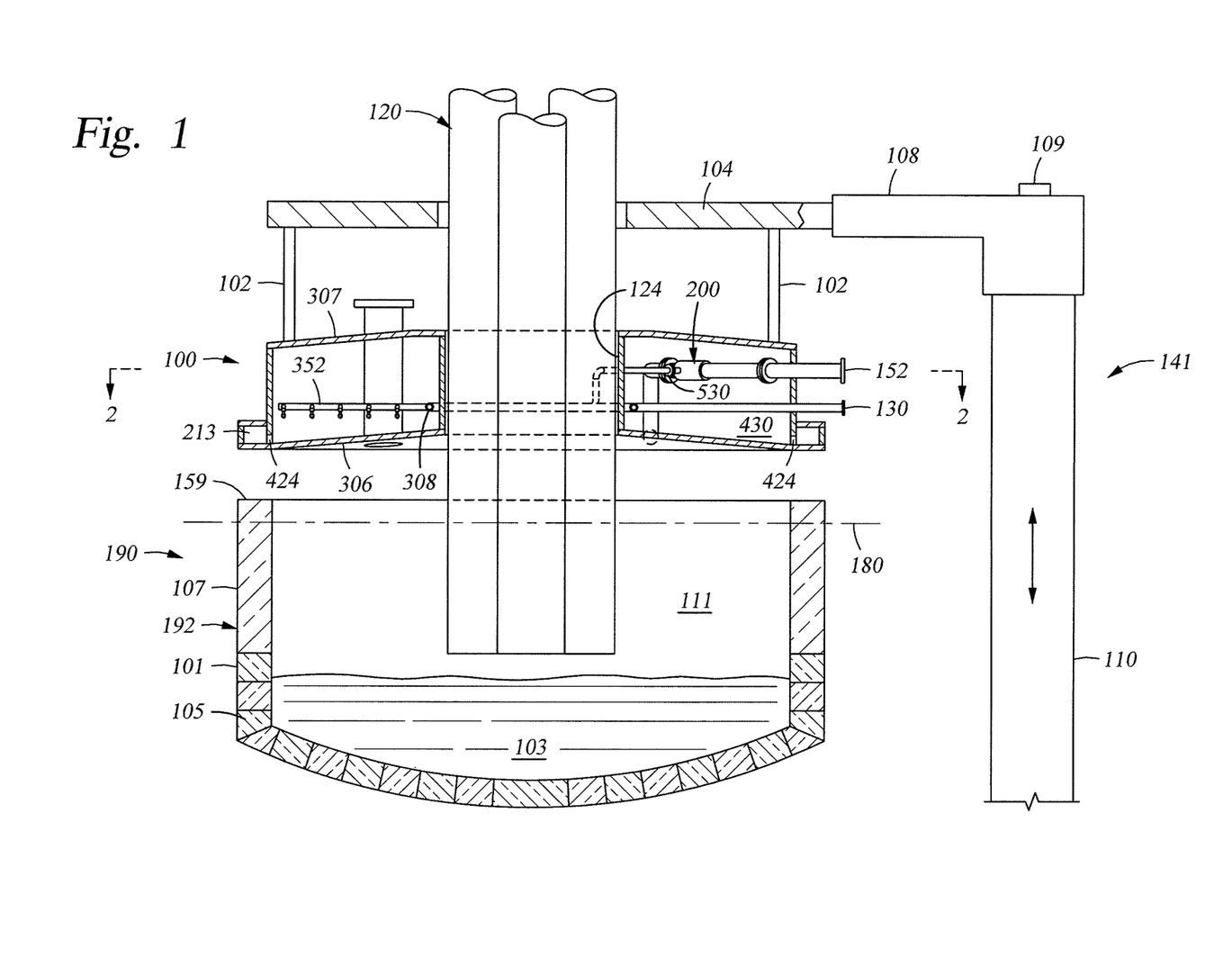
FIG. 1 illustrates an elevational side view of a metallurgical furnace having a spray-cooled roof.

FIG. 1 illustrates an elevational side view of a metallurgical furnace 190 having a spray-cooled roof 100. The metallurgical furnace 190 is suitable for melting scrap and other metals therein. The metallurgical furnace 190 may have temperatures exceeding 1,650° Celsius therein. The metallurgical furnace 190 utilizes a spray-cool system to protect itself from these elevated temperatures so as to avoid damage such as structural melting, compromise of seals or valves and/or exceeding the yield strength for structural components.

The metallurgical furnace 190 has a body 192. The body 192 has a hearth 101 that is lined with refractory brick 105, and a sidewall 107 that sits on top of the hearth 101. The sidewall 107 has a top 159. The spray-cooled roof 100 is moveably disposed on the top 159 of the sidewall 107. The metallurgical furnace 190 has an interior volume 111. The interior volume 111 of the metallurgical furnace 190 enclosed by the spray-cooled roof 100 and the body 192. The interior volume 111 may be loaded or charged with material 103, e.g., metal, scrap metal, or other meltable material, which is to be melted within the metallurgical furnace 190.

The metallurgical furnace 190, including the body 192 and the spray-cooled roof 100, is rotatable along a tilt axis 180 about which the metallurgical furnace 190 can tilt. The metallurgical furnace 190 may be tilted in a first direction about the tilt axis 180 toward the slag door (not shown) multiple times during a single batch melting process, sometimes referred to as a "heat", to remove slag. Similarly, the metallurgical furnace 190 may be tilted in a second direction about the tilt axis 180 towards a tap spout (not shown) multiple times during a single batch melting process including one final time to remove the molten material 103.

Roof lift members 102 may be attached at a first end to the spray-cooled roof 100. The roof lift members 102 may by chains, cables, ridged supports, or other suitable mechanisms for supporting the spray-cooled roof 100. The roof lift members 102 may be attached at a second end to a gantry superstructure 141. The gantry superstructure 141 has one or more mast arms 104 and a mast post 108. The mast arms 104 extend horizontally and spread outward from a mast support 108. The mast support 108 is supported by the mast post 110. A coupling 109 attaches the mast post 110 to the mast support 108. The gantry superstructure 141, i.e., mast support 108, the coupling 109 and the mast post 110, rotates for lifting the spray-cooled roof away from the sidewall 107. In one embodiment, the spray-cooled roof 100 is configured to swing or lift away from the sidewall 107. The spray-cooled roof 100 is lifted away from the sidewall 107 to expose the interior volume 111 of the metallurgical furnace 190 through a top 159 of the sidewall 107 for loading material therein.

Figure 2:
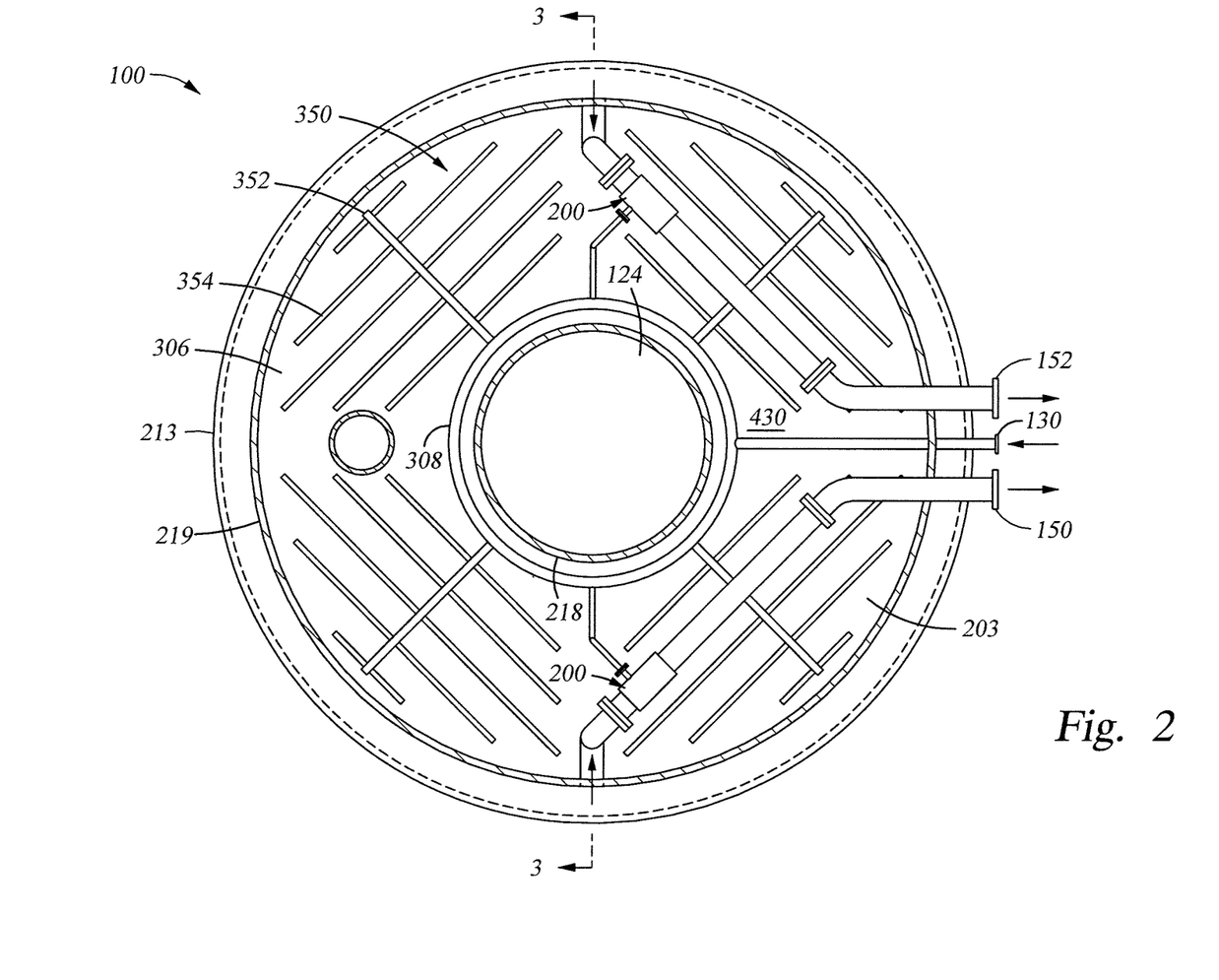
FIG. 2 illustrates a top plan view of the spray-cooled roof of the metallurgical furnace in FIG. 1.

The spray-cooled roof 100 may be circular in shape when viewed from a top plan view, such as shown in FIG. 2. A central opening 124 may be formed through the spray-cooled roof 100. Electrodes 120 extend through the central opening 124 from a position above the spray-cooled roof 100 into the interior volume 111. During operation of the metallurgical furnace 190, the electrodes 120 are lowered through the central opening 124 into the interior volume 111 of the metallurgical furnace 190 to provide electric arc-generated heat to melt the material 103. The spray-cooled roof 100 may further include an exhaust port to permit removal of fumes generated within the interior volume 111 of the metallurgical furnace 190 during operation.

FIG. 2 illustrates a top plan view of the spray-cooled roof 100 of FIG. 1. The spray-cooled roof 100 additionally has an outer wall 219 and an inner wall 218. The inner wall 218 bounds the central opening 124 which is located concentric to a center (e.g., the centerline) 299 of the spray-cooled roof 100. The central opening 124 is configured for electrodes to enter into the furnace for melting material therein. The spray-cooled roof 100 may have an upwardly sloping shape, for example a frustoconical or torispherical shape, and is disposed over the metallurgical furnace 190 to enclose the interior volume 111. Alternatively, the spray-cooled roof 100 may have other shapes.

The spray-cooled roof 100 has a hollow metal roof section 203. The spray-cooled roof 100 has a spray-cooling system 350 inside an enclosed space 430 of the hollow metal roof section 203 that is detailed further below with reference to FIG. 3 and FIG. 4. A coolant supply 130 provides coolant to the spray-cooling system 350 interfaced with the spray-cooled roof 100. The coolant, such as water or other suitable fluid, is provided internally to the hollow metal roof section 203 to cool the spray-cooled roof 100. The coolant supply 130 is fluidly coupled to the spray-cooling system 350 inside the enclosed space 430. The coolant is sprayed within the hollow metal roof section 203 to maintain the surfaces of the spray-cooled roof 100 facing the interior of the furnace below a maximum operating temperature.

The spray-cooled roof 100 includes an evacuation drain 213 provided along the outer wall 219 of the hollow metal roof section 203. The evacuation drain 213 is a continuous unitary circumferential drain having dedicated one or more drain outlets, such as a first drain outlet 150 and a second drain outlet 152. The drain outlets 150, 152 evacuate the coolant from the enclosed space 430 of the hollow metal roof section 203 via the evacuation drain 213.

Figure 3:
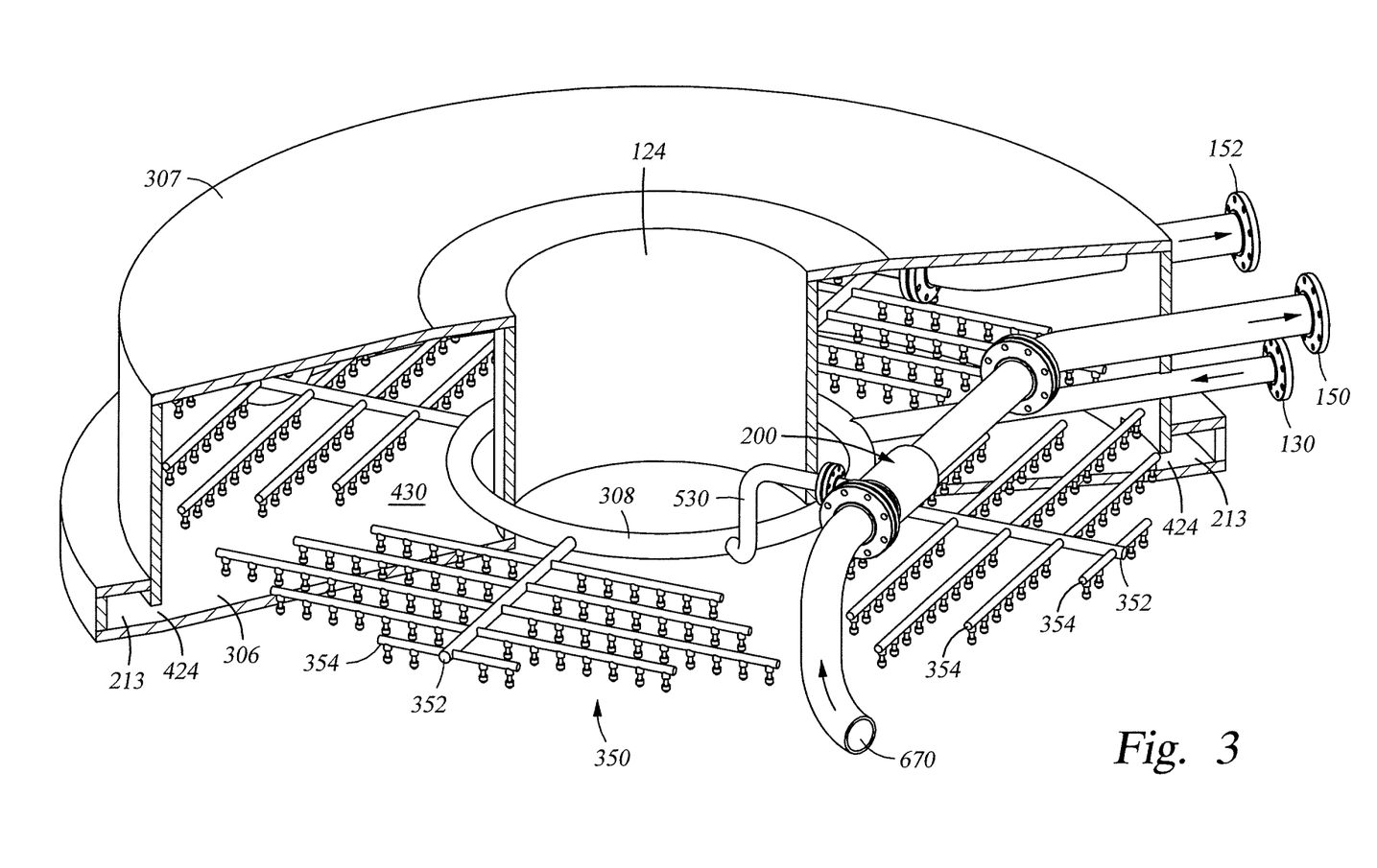
FIG. 3 illustrates an elevation view of the spray-cool system of the spray-cooled roof of FIG. 2.
Figure 4:
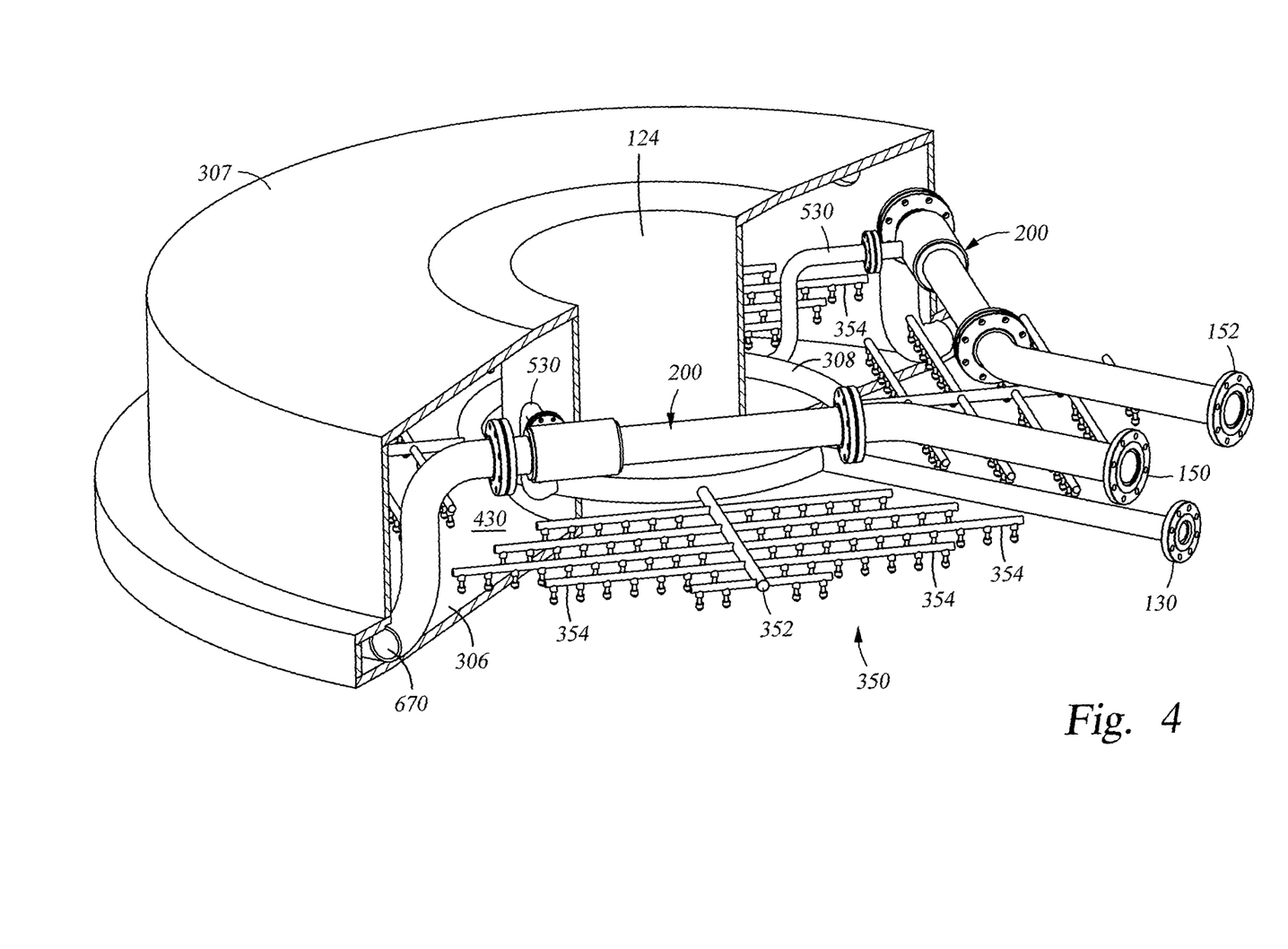
FIG. 4 illustrates an elevation view of the roof shown in FIG. 2.

Referring now briefly to FIGS. 3 and 4, the hollow metal roof section 203 is shown in further detail. The hollow metal roof section 203 comprises an upwardly sloping inner metal base member 306 shaped to form a predetermined portion of the spray-cooled roof 100. The inner side of the metal base member 306 faces the interior of the furnace. An outer metal covering member 307 may additionally be shaped to form a predetermined portion of the spray-cooled roof 100. The outer metal covering member 307 is spaced from the inner metal base member 306, such that the inner surface of the metal base member 306 faces the outer metal covering member 307. The space between the metal base member 306 and the metal covering member 307 is the enclosed space 430. The enclosed space 430 is sized for the spray cooling system 350 therein and is configured to prevent coolant sprayed therein from leaking into or onto the furnace.

The spray-cooling system 350 includes a liquid coolant supply header 308 affixed to the hollow metal roof section 203 and extends around the inner metal base member 306. The coolant supply 130 communicates with the liquid coolant supply header 308 of the spray-cooling system 350 such that the entire spray-cooled roof 100 may be supplied coolant from a single supply source. The coolant supply 130 supplies liquid directly to the hollow metal roof section 203 from a liquid coolant supply source located outboard of the spray-cooled roof 100.

The spray-cooling system 350 includes a plurality of branch conduits 352 and a plurality of fluid distribution outlets 354 fluidly coupled to the liquid coolant supply header 308. The plurality of branch conduits 352 are fluidly coupled to the liquid coolant supply header 308 and extend therefrom within the enclosed space 430 of the hollow metal roof section 203. The fluid distribution outlets 354 are disposed on the distal ends of each branch conduits 352. Coolant flows into the liquid coolant supply header 308, through the branch conduits 352, out the fluid distribution outlets 354, into the enclosed space 430, and onto the inner surface of the upwardly sloping inner metal base member 306. The spray-cooling system 350 maintains a temperature profile for the hollow metal roof section 203 by spraying coolant for maintaining the temperature of the inner metal base member 306 of the spray-cooled roof 100 at a desirable level.

The spray-cooling system 350 includes an evacuation system. The evacuation system which collects and removes the sprayed (i.e., spent) coolant from the enclosed space 430 of the hollow metal roof section 203. The evacuation system has one or more outer liquid drain openings 424 located at the lowermost portion of the enclosed space 430 and one or more pumps. The outer liquid drain openings 424 collect the coolant sprayed in the enclosed space 430 by the spray-cooling system 350 and empties into the evacuation drain 213 for removal. The one or more pumps 200, such as one or more venturi pumps, are coupled to the evacuation drain 213 and are utilized to empty the external evacuation drain 213 to drain the spray-cooled roof 100 of cooling fluid regardless of the tilt inclination of the spray-cooled roof 100.

Figure 5A:
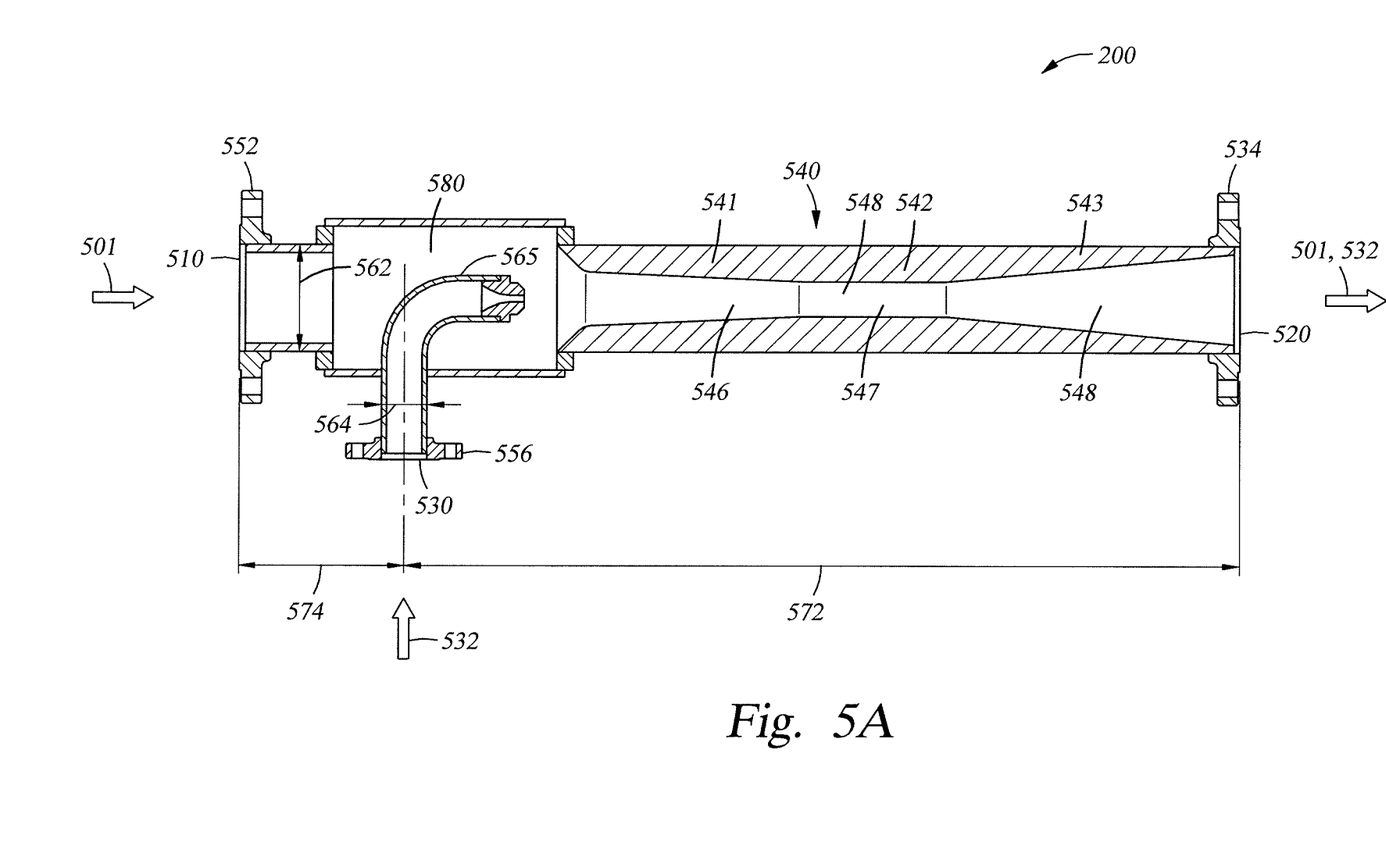
FIG. 5A illustrates one embodiment of a venturi pump suitable for use in the spray-cooled roof.
Figure 5B:
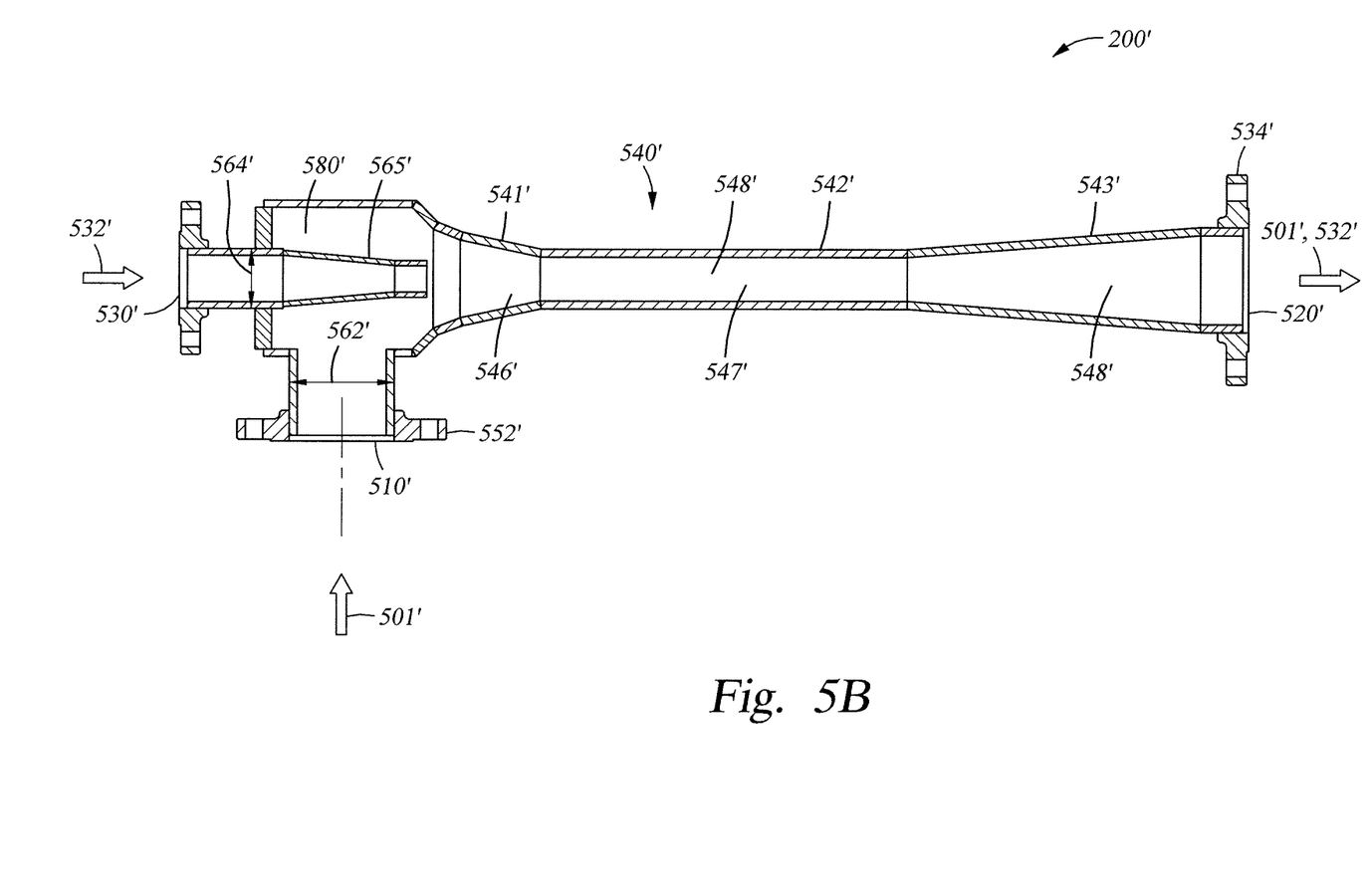
FIG. 5B illustrates a second embodiment of a venturi pump suitable for use in the spray-cooled roof.

FIG. 5A illustrates one embodiment of the pump 200 suitable for use in the spray-cooled roof 100. FIG. 5B illustrates a second embodiment of the pump 200 suitable for use in the spray-cooled roof 100. The pump 200 is suitable to withstand high temperatures and air gaps created in the fluid stream due to intermittent siphoning on going during the titling of the metallurgical furnace 190 and the spray-cooled roof 100. The pump 200 illustrated in FIGS. 5A and 5B are a venturi pump or an aspirator/jet pump. The embodiment of FIG. 5B has the motive source and the suction inlet swapped from the embodiment of FIG. 5A. It should be appreciated that choosing the appropriate embodiment to for the removal of spent coolant may be determined based on space constraints among other considerations. However, the understanding of operation for the venturi pump 200 in FIG. 5A is essentially the same for that shown in FIG. 5B. Therefore, for the sake of brevity and simplicity, further discussion of the venturi pump 200 will be with regard to only FIG. 5A. Although, it should be appreciated that other types of pumps may be equally suitable, further discussion of the pump 200 will be with regard to venturi pump (200). The venturi pump 200 is well suited for high temperature conditions as the venturi pump 200 does not have any lubricated moving parts subject to expansion, wear, or other modes of failure.

The venturi pump 200 operates on the principle of a first fluid entraining a second fluid. The venturi pump 200 has a first inlet 510, a motive inlet 530, a suction chamber 580 and a discharge outlet 520. The first inlet 510 and motive inlet 530 are fluidly coupled to the suction chamber 580. The venturi pump 200 additionally has a tube 540 disposed between the suction chamber 580 and the discharge outlet 520.

The motive inlet 530 is coupled to a source of motive fluid 532. The motive fluid 532 may be a liquid, gas, or steam. In one embodiment, the source for the motive fluid 532 is liquid coolant supply header 308 and the motive fluid is the coolant therein the liquid coolant supply header 308. In other embodiments, the motive fluid 532 is provided by plumbing externally routed to the roof. The motive fluid 532 is under pressure and enters the motive inlet 530, travels through a nozzle assembly 564 into the suction chamber 580. The nozzle assembly 564 converts the pressure of the motive fluid 532 into a high velocity stream, i.e., where the pressure energy is converted into kinetic energy. The nozzle assembly 564 directs the motive fluid 532 into the suction chamber 580.

The suction chamber 580 provides a pressure drop for drawing the secondary fluid, i.e., spent spray-cooled coolant 501 through the first inlet 510 and into the suction chamber 580. The pumping action begins when spent spray-coolant in the suction chamber is entrained by the high velocity stream emerging from the nozzle assembly 564, lowering the pressure in the suction chamber. The entrained spent spray-cooled fluid mixes with the motive fluid 532 and acquires part of the energy from the high velocity stream of the motive fluid 532. The resulting action causes the spent spray-coolant in the suction chamber 580 to flow toward the discharge outlet 520 via the tube 540.

The tube 540 narrows in a first section 541 to a second section 542 and then expand to a third section 543. The first section 541 acts as a converging inlet nozzle 546. The second section 542 is a throat 547. In operation, the converging inlet nozzle 546 of the first section 541 accelerates the fluid causing a first pressure drop while the throat 547 of the second section 542 causes an additional second pressure drop due to friction. The third section 543 is a diffuser 548 fluidly coupled to the discharge outlet 520. The diffuser 548 of the third section 543 results in pressure recovery from the first section 541 and second section 542 pressure loss. The angle of divergence in the third section 543 is small to prevent flow separation. The third section 543 increases the head sufficiently to allow the spent coolant fluid to be piped away from the metallurgical furnace 190 for recovery or recycling. In the tube 540, the velocity of the mixture is converted to a pressure greater than the suction pressure, but lower than the operating pressure. That is, the high-velocity jet entrains the secondary fluid. The two streams mix in the mixing tube, leading to pressure recovery. Further static pressure is recovered in a narrow-angle diffuser 548 downstream of the mixing tube.

The flow of the motive fluid 532 in the tube 540 produces a vacuum, by means of the venturi effect, which entrains, i.e., draws along with or after oneself, the spent spray-cooled coolant 501 for removal out the discharge outlet 520. The discharge outlet 520 has a flange 534. The flange 534 couples to external plumbing for removing the spray-coolant from the metallurgical furnace 190 for recovery or recycling.

The venturi pump 200 utilize the pressure energy of a high-pressure fluid stream from the liquid coolant supply header 308 to boost the pressure and/or flow of a low-pressure spent spray-coolant in the evacuation drain 213. The venturi pump 200 operates with no moving parts. Three key parameters for venturi pump 200 are the pressure ratio, defined by:

$$N = \frac{P_5 - P_2}{P_1 - P_5}$$

where $P_1$ is the primary flow pressure (motive fluid 532), $P_2$ is the secondary flow pressure (spent spray-cooled coolant 501), and $P_5$ is the combined outlet pressure (501+532).

The flow ratio $M = \dot{V}_2/\dot{V}_1$ and the ratio of mixing tube-to-nozzle assembly 564 diameter (R) are related through the equation:

$$N = \frac{2R + \frac{2CM^2R^2}{1-R} - R^2(1+CM)(1+M)(1+K_m+K_d) - \frac{CM^2R^2}{(1-R)^2}(1+K_s)}{(1+K_p) - 2R - \frac{2CM^2R^2}{1-R} + R^2(1+CM)(1+M)(1+K_m+K_d)}$$

where C is the density ratio of the spent spray-cooled coolant 501 (secondary) to motive fluid 532 (primary). The loss coefficients $K_p$, $K_s$, $K_m$ and $K_d$ account for losses in the nozzle assembly 564 of the primary fluid (motive), secondary flow (first inlet 510), suction chamber 580 and diffuser 548, respectively. The equation can be solved directly for N if C, M and R are known. Given the primary and secondary flows/pressures, an optimum value of R can be found by trial and error. Once the ratios have been determined, the primary nozzle can be sized from $$D_n = \sqrt{\frac{4V_1}{C_D\pi} \sqrt{\frac{\rho_1}{2(P_1-P_2)}}}$$

The venturi pump 200 has a first length 574 from the first inlet 510 to the motive inlet 530 of between about 1.5 inches to about 12 inches. The venturi pump 200 has a second length 572 (overall length) from the motive inlet 530 to the discharge outlet 520 of between about 5 inches to about 111 inches. The motive inlet 530 may have an operating water pressure between about 15 psig to about 200 psig. The venturi pump thus can be sized to pump the most suction liquid (spent coolant) with the least operating liquid (motive fluid). Thus, the venturi pump 200 can be made sufficiently small to be incorporated into or with the spray-cooled roof 100 saving valuable floor space and plumbing.

Figure 6A:
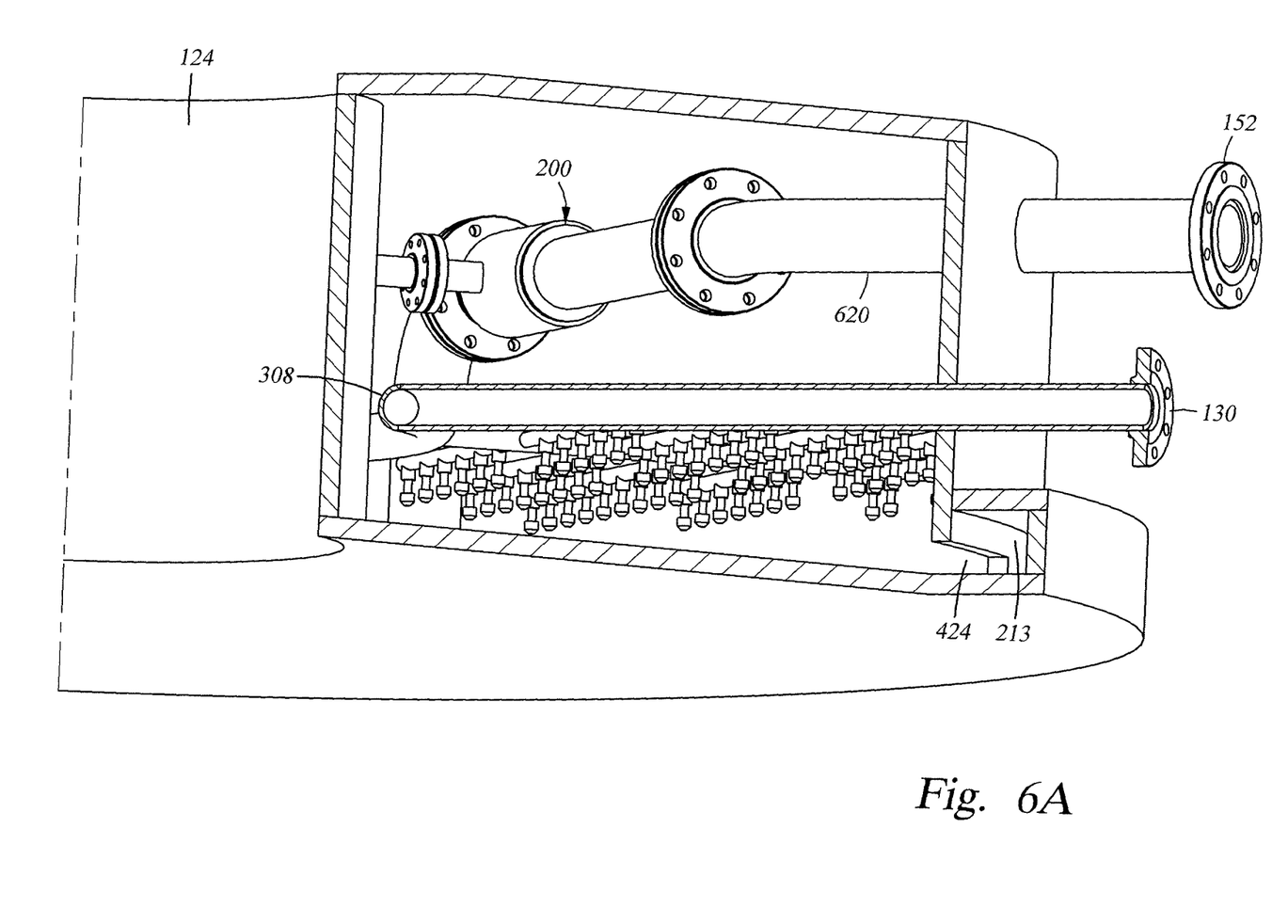
FIG. 6A illustrates a first embodiment of a pump positioned in the spray-cooled roof.

FIG. 6A illustrates a first embodiment of the pump 200 located in the spray-cooled roof 100. The venturi pump 200 is disposed within the enclosed space 430 of the spray-cooled roof 100. The venturi pump 200 may be cooled by the spray-cooling system 350 within the enclosed space 430. The motive inlet 530 of the venturi pump 200 is fluidly coupled to the liquid coolant supply header 308. The venturi pump 200 has a discharge connection 620 protruding through the spray-cooled roof. The discharge outlet 520 of the venturi pump 200 is fluidly coupled to the discharge connection 620 to flow the spent spray-cooled coolant 501 and motive fluid 532 via external plumbing to an external coolant recovery system. The first inlet 510 of the venturi pump 200 is situated in the evacuation drain 213. Alternately, plumbing 670 may fluidly couple the first inlet 510 to the evacuation drain 213. For example, the first inlet 510 may have a suction pipe 670 extending therefrom and into the evacuation drain 213. Advantageously, the venturi pump 200 may be kept cool and protected within the spray-cooled roof 100 to prevent damage, have reduced plumbing requirements for the drain system, and a reduced overall impact for the foot print for the cooling/draining system on the facility floor.

Figure 6B:
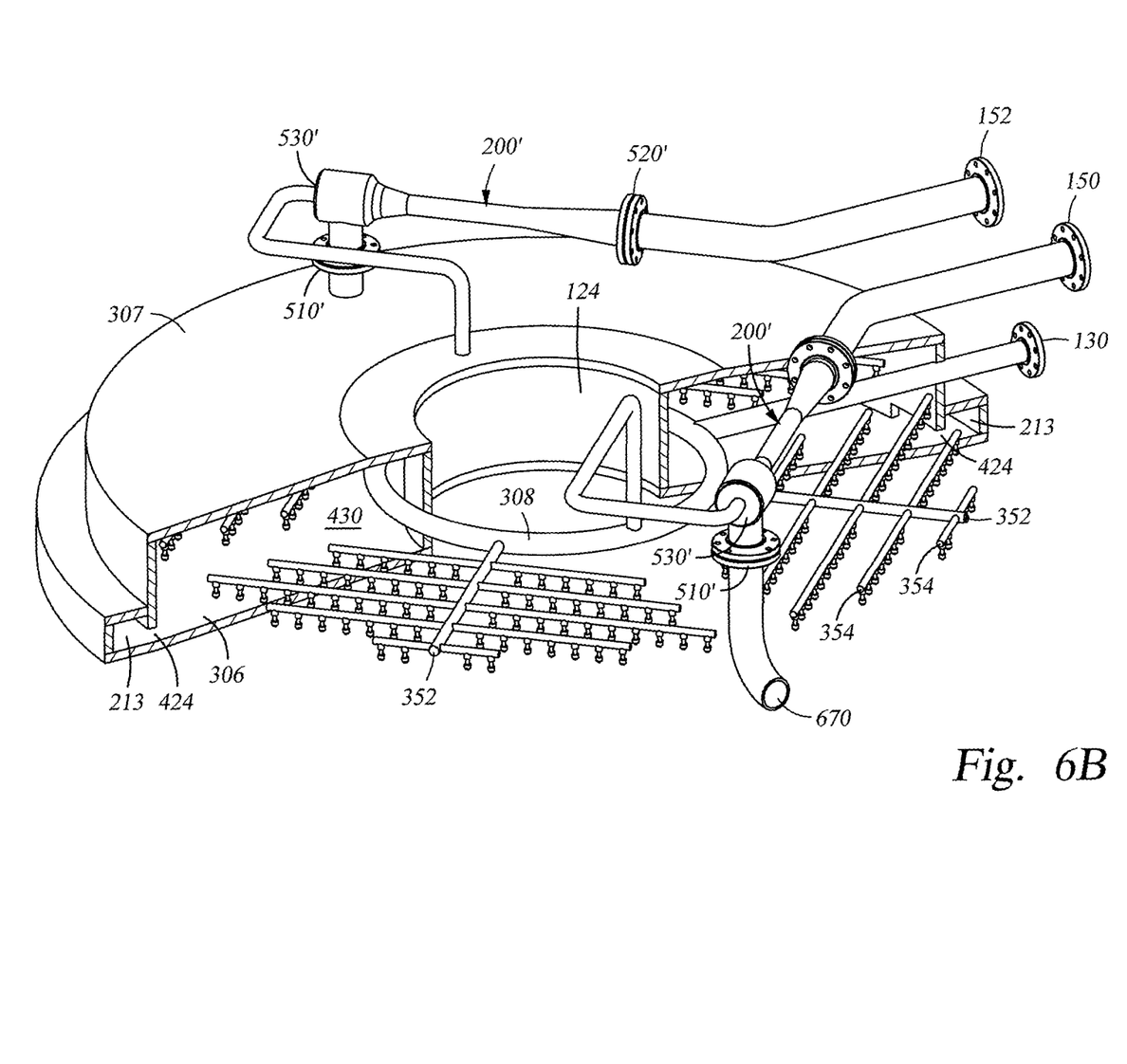
FIG. 6B illustrates a second embodiment of a pump positioned on the spray-cooled roof.

FIG. 6B illustrates a second embodiment of the pump 200 located on the spray-cooled roof 100. The venturi pump 200 is disposed on or coupled to the outer metal covering member 307 of the spray-cooled roof 100. The motive inlet 530 of the venturi pump 200 is fluidly coupled through the outer metal covering member 307 of the spray-cooled roof to the liquid coolant supply header 308 within the enclosed space 430. The spent spray-cooled coolant 501 and motive fluid 532 flows through the discharge outlet 520 of the venturi pump 200 to an external coolant recovery system via external plumbing. The first inlet 510 of the venturi pump 200 is plumbed through the outer metal covering member 307 to fluidly couple the first inlet 510 to the evacuation drain 213. Advantageously, the venturi pump 200 is easily accessible for maintenance, has reduced plumbing requirements for the drain system, and a reduced overall impact for the foot print for the cooling/draining system on the facility floor.

Figure 7:
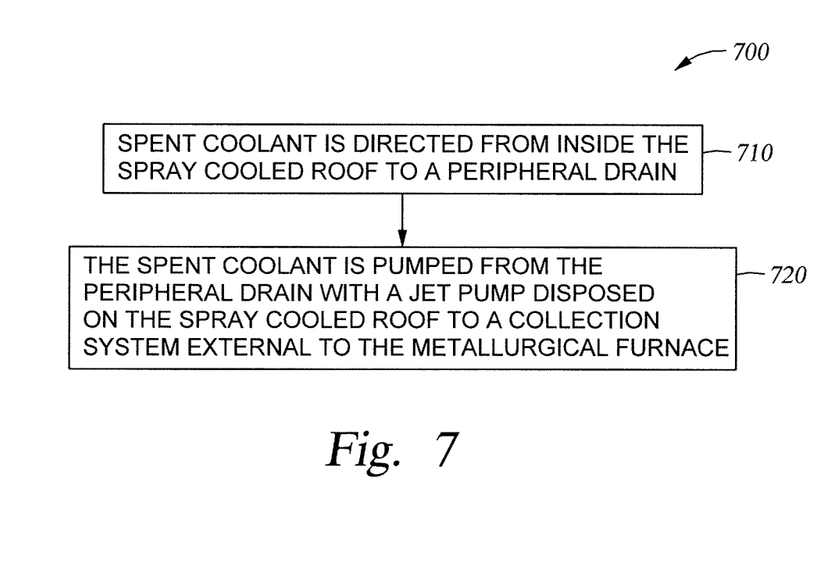
FIG. 7 illustrates a method for removing spent coolant from within a spray-cooled roof of a metallurgical furnace.

FIG. 7 illustrates a method 700 for removing spent coolant from within a spray-cooled roof of a metallurgical furnace. The method begins at block 710 by directing spent coolant from inside the spray-cooled roof to a peripheral drain. At block 720, the spent coolant is pumped from the peripheral drain with a jet pump disposed on the spray-cooled roof to a collection system external to the metallurgical furnace. As discussed above, the motive source of the jet pump is coupled to directly to the spray-coolant header disposed inside the spray-cooled roof. In one embodiment, the jet pump is disposed on top of the spray-cooled roof. In another embodiment, the jet pump is disposed in an interior portion of the spray-cooled roof. The jet pump disposed inside the roof permits spray-cooling of the jet pump with the spray-coolant prior to the spray-coolant entering the peripheral drain.

Advantageously, the venturi pump 200 has no moving parts, nothing to break or wear. There are no packing glands. No lubrication is required. They are practically noiseless in operation. The initial cost is low. Installation cost is low because they are compact and no foundation or wiring is necessary. They provide reliable operation with low maintenance cost. Furthermore, the plumbing of the motive source internally to the spray-cooled system reduces the amount of additionally plumbing required. The small footprint for the venturi pump 200 is coincident with the furnace reducing valuable factory space and has the added benefit of reducing water consumption.

While the foregoing is directed to embodiments of the present disclosure, other and further embodiments may be devised without departing from the basic scope thereof, and the scope thereof is determined by the claims that follow.

What is claimed is:

1. A spray-cooled roof for a metallurgical furnace, the spray-cooled roof comprising:
    a hollow metal roof section, the hollow metal roof section comprising:
        an outer metal cover;
        an inner metal plate spaced from and opposite the outer metal covering member, the inner metal plate configured to face an interior of a metallurgical furnace;
        an enclosed space disposed between the outer metal cover and the inner metal plate; and
    a spray-cooled system disposed in the enclosed space wherein the spray-cooled system comprises:

a coolant supply header conduit attached to fluid outlets;
an evacuation drain fluidly coupled to the enclosed space; and
a venturi pump disposed above the inner metal plate and integrated into the spray-cooled roof, the venturi pump coupled to the evacuation drain, wherein the venturi pump comprises:
a motive inlet fluidly coupled to the coolant supply header.

2. The spray-cooled roof of claim 1, wherein the enclosed space comprises:
an outer liquid drain opening located at a lowermost portion of the enclosed space, the outer liquid drain opening coupled to the evacuation drain.

3. The spray-cooled roof of claim 2, wherein the venturi pump further comprises:
an inlet coupled to the evacuation drain; and
a discharge outlet.

4. The spray-cooled roof of claim 1, wherein the motive inlet is disposed outside the enclosed space.

5. The spray-cooled roof of claim 1, wherein the venturi pump is disposed inside the enclosed space.

6. The spray-cooled roof of claim 1, wherein the venturi pump is disposed within the enclosed space.

7. The spray-cooled roof of claim 1, wherein the venturi pump is coupled to the outer metal covering member outside of the enclosed space.

8. A metallurgical furnace, comprising:
a body comprising:
a hearth lined with refractory brick; and
a sidewall disposed on top of the hearth, the sidewall having a top;
a spray-cooled roof moveably disposed on the top of the sidewall, the spray-cooled roof comprising:
an outer metal cover;
an inner metal plate spaced from and opposite the outer metal covering member, the inner metal plate configured to face an interior of a metallurgical furnace;
an enclosed space disposed between the outer metal cover and the inner metal plate; and
a spray-cooled system disposed in the enclosed space wherein the spray-cooled system comprises:
a coolant supply header conduit attached to fluid outlets;
an evacuation drain fluidly coupled to the enclosed space; and
a venturi pump disposed above the inner metal plate and integrated into the spray-cooled roof, the venturi pump coupled to the evacuation drain, wherein the venturi pump comprises:
a motive inlet fluidly coupled to the coolant supply header.

9. The metallurgical furnace of claim 8 wherein the enclosed space further comprises:
at least one outer liquid drain opening being located at a lowermost portion of the enclosed space for spent coolant evacuation and coupled to the evacuation drain.

10. The metallurgical furnace of claim 9 wherein the venturi pump further comprises:
an inlet coupled to the evacuation drain; and
a discharge outlet.

11. The metallurgical furnace of claim 8 wherein the motive inlet is coupled through the outer metal covering member.

12. The metallurgical furnace of claim 10 wherein the discharge outlet is coupled through the outer metal covering member.

13. The metallurgical furnace of claim 8 wherein the venturi pump is disposed within the enclosed space.

14. The metallurgical furnace of claim 8 wherein the venturi pump is disposed on the outer metal covering member outside the enclosed space.

15. A method for removing spent coolant from within a spray-cooled roof of a metallurgical furnace, the method comprising:
coupling a motive source of a venturi pump directly to a spray-coolant header disposed inside the spray-cooled roof;
directing spent coolant from inside the spray-cooled roof to a peripheral drain; and
pumping the spent coolant from the peripheral drain with the venturi pump coupled to an exterior of or disposed in the spray-cooled roof, wherein the spent coolant is pumped to a collection system external to the metallurgical furnace.

16. The method of claim 15, wherein the venturi pump is disposed on top of the spray-cooled roof.

17. The method of claim 15, wherein the venturi pump is disposed in an interior portion of the spray-cooled roof.

18. The method of claim 17 further comprising:
spray-cooling the venturi pump with the spray-coolant prior to the spray-coolant entering the peripheral drain.

19. The method of claim 17 further comprising:
running the motive line to the venturi pump through an exterior of the roof.

\* \* \* \* \*